United States Patent
Seo

(10) Patent No.: US 6,950,659 B2
(45) Date of Patent: Sep. 27, 2005

(54) METHOD OF ALLOCATING RADIO RESOURCE

(75) Inventor: Chang Keun Seo, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 403 days.

(21) Appl. No.: 10/270,062

(22) Filed: Oct. 15, 2002

(65) Prior Publication Data

US 2003/0078046 A1 Apr. 24, 2003

(30) Foreign Application Priority Data

Oct. 19, 2001 (KR) ......................................... 2001-64720

(51) Int. Cl.$^7$ ................................................. H04L 1/02
(52) U.S. Cl. ..................... 455/450; 455/452.1; 455/336
(58) Field of Search .............................. 455/436, 452.2, 455/450–452.1, 435.1, 435.2, 435.3, 437–439, 456.2, 464, 509, 513, 161.3

(56) References Cited

U.S. PATENT DOCUMENTS

| | | | | |
|---|---|---|---|---|
| 5,551,058 A | * | 8/1996 | Hutcheson et al. | 455/429 |
| 5,787,346 A | * | 7/1998 | Iseyama | 455/439 |
| 6,038,449 A | * | 3/2000 | Corriveau et al. | 455/439 |
| 6,542,742 B2 | * | 4/2003 | Schramm et al. | 455/436 |
| 6,701,149 B1 | * | 3/2004 | Sen et al. | 455/436 |

* cited by examiner

*Primary Examiner*—CongVan Tran
(74) *Attorney, Agent, or Firm*—Fleshner & Kim, LLP

(57) ABSTRACT

A method of allocating a radio resource for a traffic burst is disclosed. The method includes the steps of selecting at least one cell having a pilot signal strength that is greater than a pilot signal strength of a primary cell, requesting a communication resource reservation to the selected cells, receiving results of reservation performed according to the reservation request from the selected cells, and requesting allocation of the communication resource to the cells that secure a maximum data rate by analyzing the results of reservation.

16 Claims, 3 Drawing Sheets

METHOD OF ALLOCATING RADIO RESOURCE

This application claims the benefit of the Korean Application No.P2001-64720 filed on Oct. 19, 2001, which is hereby incorporated by reference.

BACKGROUND OF THE INVENTION

1. Field of the Invention

The present invention relates generally to a mobile communication system, and more particularly, to a method of allocating a radio resource for a traffic burst.

2. Discussion of the Related Art

In the $3^{rd}$ generation CDMA mobile communication system, a mobile station has a multi-channel structure that simultaneously transmits various traffic channels in order to provide diverse multimedia service such as voice, image, and data in addition to transmission of only one traffic channel such as in the IS-95A.

The multi-channel is classified into a fundamental channel for transmitting voice information and so on, a dedicated control channel used for transmission of dedicated control information, and a supplemental channel (SCH) used for data transmission.

In the CDMA system, a handoff process for an intermediate or high speed packet service that transmits traffic data using the supplemental channel is stated in the access network interface standard "Inter-Operability Specification (IOS) for CDMA access network interface" and in the radio standard "TIA/EIA/IS-2000".

At this time, a process of allocating radio resources for the supplemental channel is required, and especially, a method for a stable providing of an optimum service during the handoff is solicited.

SUMMARY OF THE INVENTION

Accordingly, the present invention is directed to a method of allocating a radio resource that substantially obviates one or more problems due to limitations and disadvantages of the related art.

An object of the present invention is to provide a method of allocating a radio resource that can stably provide a call quality even during a handoff.

Another object of the present invention is to provide a method of allocating a radio resource that can prevent a frequent generation of a cell for transmitting traffic data.

Still another object of the present invention is to provide a method of allocating a radio resource that is suitable for a temporary interruption of service due to an unstable radio environment.

Still another object of the present invention is to provide a method of allocating a radio resource that is suitable for supporting of a data rate requested by a user.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of allocating a radio resource includes the steps of selecting at least one cell having a pilot signal strength that is greater than a pilot signal strength of a primary cell, requesting a communication resource reservation to the selected cells, receiving results of reservation performed according to the reservation request from the selected cells, and requesting allocation of the communication resource to the cells that secure a maximum data rate by analyzing the results of reservation.

In an aspect of the present invention, a method of allocating a radio resource in a communication system including a plurality of mobile stations and at least one base station that performs a radio connection of the mobile stations includes the steps of having data to be newly transmitted selecting at least one target base station having a pilot signal strength that is greater than a reference pilot signal strength at a source base station, requesting a communication resource reservation to the selected target base stations through a burst request message at the source base station, reserving the communication resource according to the reservation request, and reporting results of reservation to the source base station as a response message to the burst request message at the target base stations, and analyzing the results of reservation, and requesting allocation of the communication resource to the target base stations that secure a maximum data rate through a burst commit message at the source base station.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

The present invention is for obtaining an optimum call quality during a handoff with respect to a high and intermediate-speed packet data service through an optimum cell selection algorithm.

For this, the present invention operates at time points where an A7-burst request message for starting a traffic burst and an A7-burst commit message are transmitted. The implementation of the cell selection algorithm is not mentioned in the standard, but it is stated that the cell selection algorithm should be performed at the above-described two time points, i.e., at time points where the A7-burst request message and the A7-burst commit message are generated.

Hereinafter, the features of the present invention will be explained with reference to the accompanying drawings.

Figure 1:
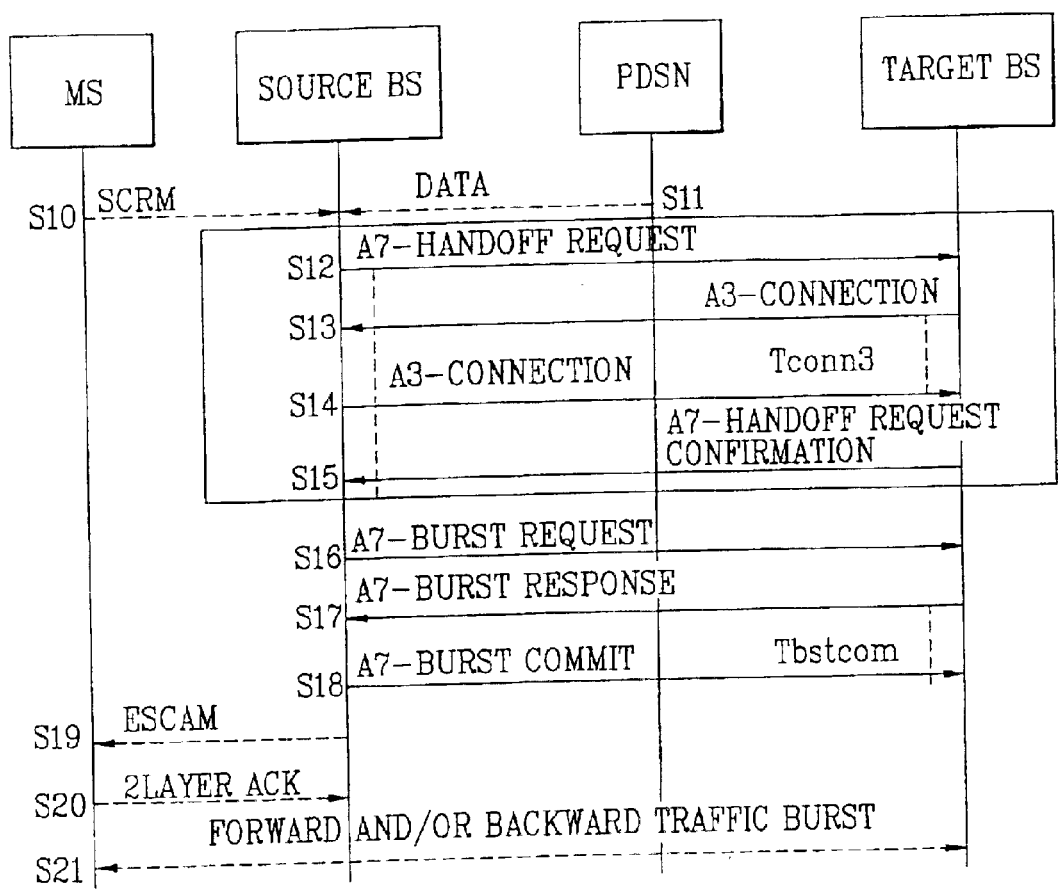
FIG. 1 is a view illustrating a soft handoff procedure between control stations in an IOS-cdma2000 access network interface.

FIG. 1 is a view illustrating a soft handoff procedure between control stations in an IOS-cdma2000 access network interface.

As shown in FIG. 1, a source base station (BS) receives a message indicating that there exists data to be sent from a mobile station (MS) or a network (i.e., a packet data serving node (PDSN)) to a MS through a supplemental channel request message (SCRM) (step 10 or step S11). The source BS decides a traffic burst on one or more new cells at a target BS that is required in support of a service instance in a soft/softer handoff.

At this time, it is assumed that a fundamental channel or dedicated control channel leg already exists on the selected cells at the target BS.

If a logical connection (i.e., according to the 3G-IOS, SCH A3 traffic connection) between the target BS and the source BS is not set, the following process should be performed.

The source BS allocates an A7 origination ID value, and transmits an A7-handoff request to the target BS to set an A3 traffic connection for supporting the SUPPLEMENTAL CHANNEL (SCH) for this call (step S12).

According to the A7-handoff request (or according to the A3 traffic connection setting request), the target BS allocates a traffic circuit, and transmits an A3 connection message to a single link procedure (SLP) of the source BS (step S13).

Thereafter, if an A3 connection acknowledgment message is transmitted from the source BS to the target BS (step S14), the A3 connection setting for the SCH between the target BS and the source BS is completed.

The target BS that received the A3 connection acknowledgment transmits an A7 handoff request acknowledgment message to a call control processor of the source BS to report the completion of the A3 connection setting to the source BS (step S15).

In FIG. 1, steps S12 to S15 may exist or not exist according to existence/nonexistence of a connection ID for the A3 connection on the SCH between a selection and distribution unit of the source BS and the target BS.

Thereafter, the source BS transmits the A7-burst request message to the target BS (step S16). This burst request message is a message for requesting the reservation of a radio resource managed by the base station in order to support the traffic burst (i.e., it means the transmission of the traffic data using the supplementary channel).

Before transmitting the A7-burst request message, the control station, which controls the source BS and the target BS, selects at least one target base station, to which the burst request message is transmitted, by driving the cell selection algorithm to be explained later.

In case that there is no target BS that is transmitting the traffic data, the control station makes the source BS transmit the burst request message to the target BS having the biggest pilot signal strength among the pilot signal strengths reported from the corresponding target BSs. However, in case that there are target BSs that are transmitting the traffic data, the control station makes the source BS transmit the burst request message to the target BS having a pilot signal strength bigger than that of the primary cell among the pilot signal strengths reported from the corresponding target BSs.

At this time, the source BS requests the reservation of the radio resource and the desired data rate through the burst request message.

According to the present invention, the interface between cells or base stations is given more weight than the combined gain with respect to the SCH to always maintain only one primary cell. That is, with respect to the SCH is used a method that does not support the soft handoff.

In response to the request for the radio resource reservation, the corresponding target BS reports the supportable data rate and the result of the radio resource reservation to the source BS by a response message to the A7-burst request message.

The source BS receives the response message to the A7-burst request message (step S17), and transmits an A7-burst commit message to the target BS (step S18). This burst commit message is a message for indicating the radio resource to be used for the traffic burst.

The source BS, before transmitting the burst commit message, drives the cell selection algorithm in the same manner.

The source BS selects the target BS that secure the maximum data rate by analyzing the response messages to the A7-burst request message. The source BS requests the radio resource allocation to the selected target BS by the burst commit message. If the number of the target BSs that secure the maximum data rate is two or more, the source BS selects one among the target BSs that has the biggest pilot signal strength reported from the target BS.

Accordingly, if the A7-burst commit message is received, the target BS allocates the radio resource reserved by the burst request message, and makes the traffic data transmitted using the corresponding radio resource.

Figure 2:
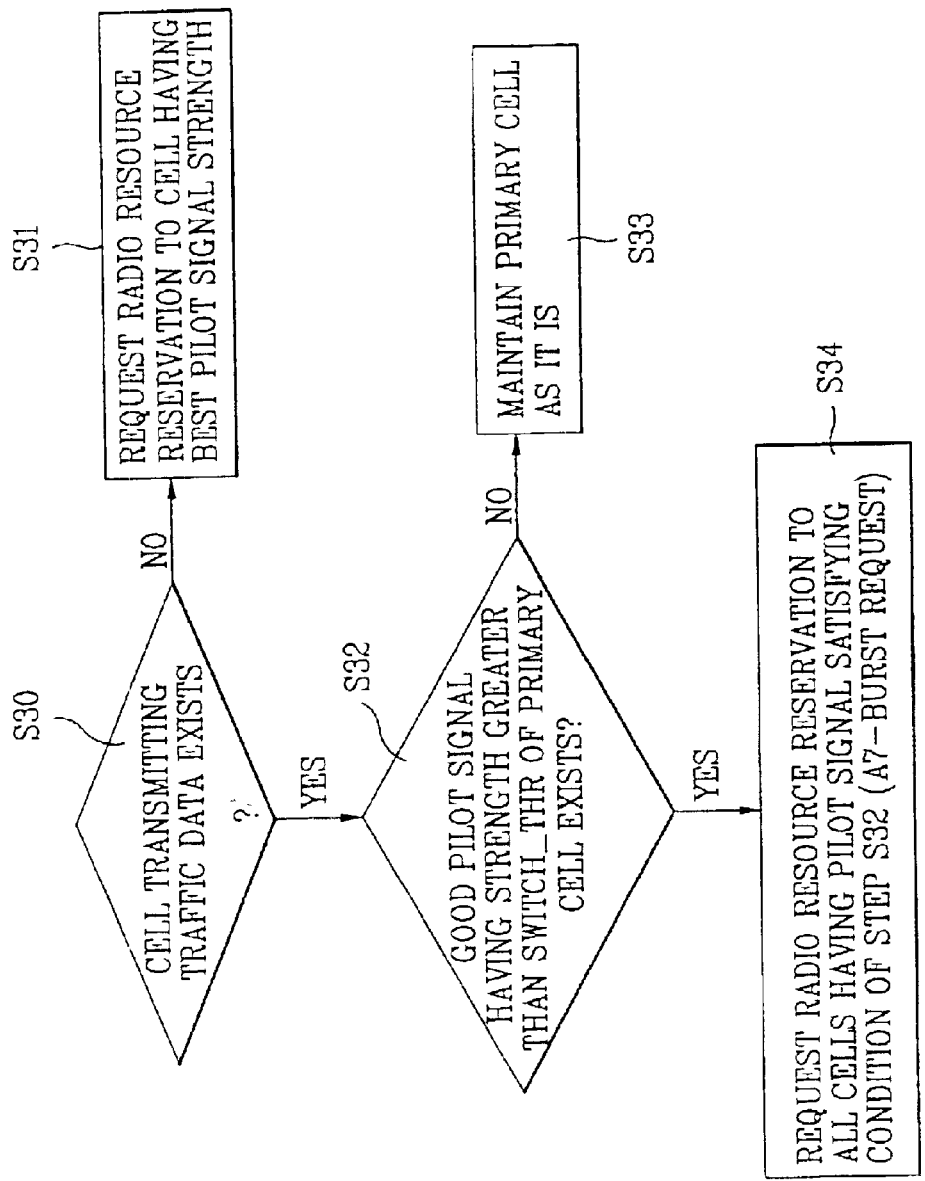
FIG. 2 is a flowchart illustrating a procedure of selecting a cell to which a radio resource reservation is to be requested according to the present invention.
Figure 3:
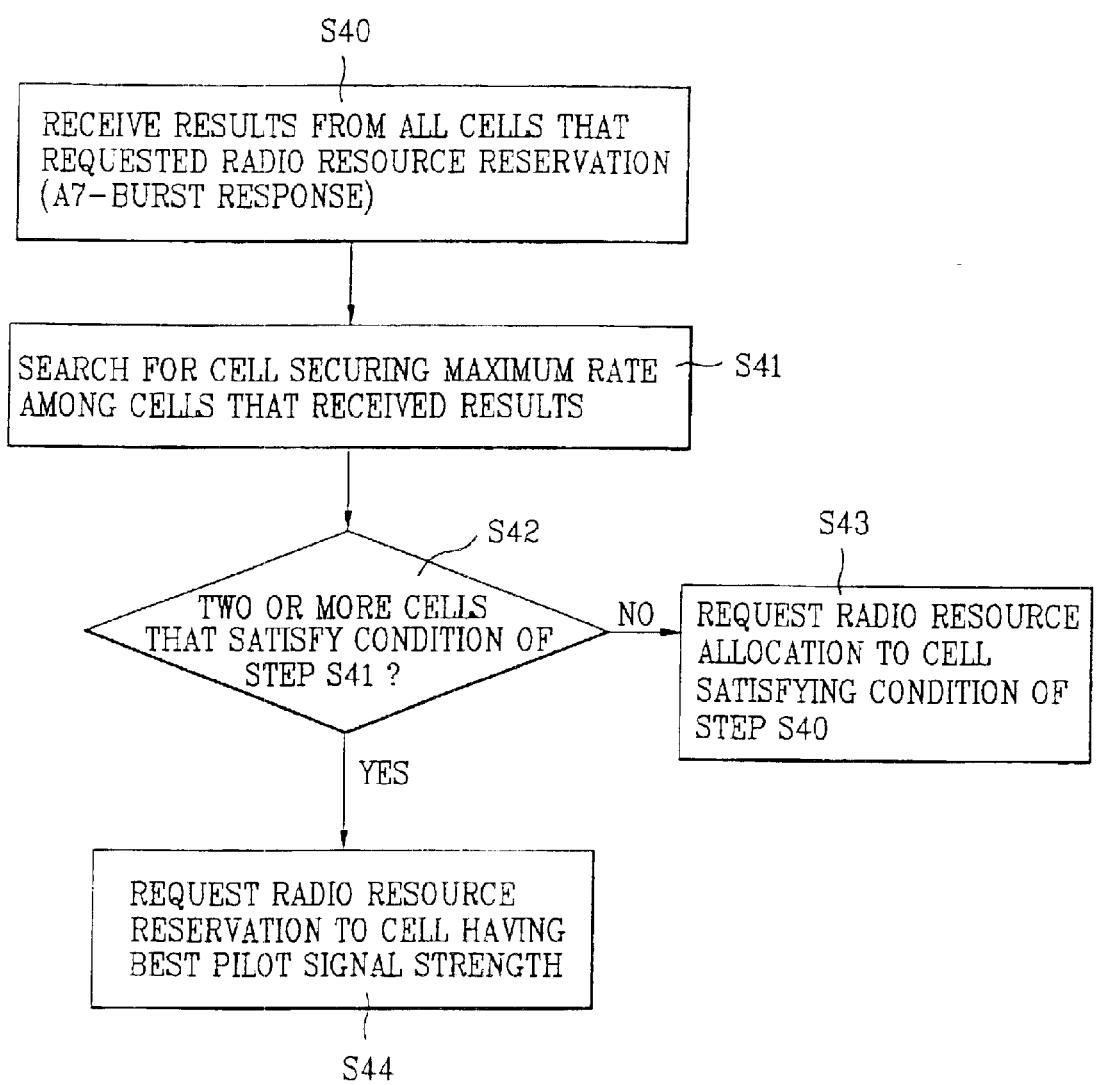
FIG. 3 is a flowchart illustrating a procedure of selecting a cell to which traffic data is to be transmitted according to the present invention.

Accordingly, it is required for the source BS (i.e., base station) to judge selection of at least one target BS for which the radio resource is to be reserved, and selection of at least one target BS to which the traffic data is to be actually transmitted among the BSs that have reserved the radio resource. The judgment process performed at this time is illustrated in FIGS. 2 and 3.

The source BS, after transmitting the A7-burst commit message, commands the mobile station (MS) to prepare the traffic burst by an extended supplemental channel assignment message (ESCAM) (step S19).

Accordingly, the MS informs the source BS that it has received the command from the source BS by a '2-layer acknowledgment' message (step S20).

The network and the MS exchange forward and/or reverse traffic burst information for a specified time period or until the source BS or the target BS stops or extends the traffic burst (step S21).

FIG. 2 is a flowchart illustrating the procedure of selecting a cell to which a radio resource reservation is to be requested according to the present invention.

Hereinafter, the term 'cell' is used as the same meaning as the BS.

FIG. 2 shows the algorithm that selects the cell to which the burst request message is to be transmitted as in FIG. 1.

The source BS judges if there is any cell that is transmitting the traffic data (step S30).

If it is judged that there is no cell that is transmitting the traffic data, the source BS requests the radio resource reservation to the cell having the biggest pilot signal strength among the reported pilot signal strengths (step S31).

On the contrary, if it is judged that there is a primary cell that is transmitting the traffic data, the source BS then judges if there is any cell having the pilot signal strength that is bigger than the threshold value (SWITCH_THR) of the pilot signal strength of the determined primary cell among the reported pilot signal strengths (step S32).

At this time, the threshold value (SWITCH_THR) is for changing the primary cell, and may have a different value according to the system environment. The primary cell indicates the cell that is transmitting the traffic data through the supplement channel (SCH).

Since the radio environment is not a stable environment, being different from the wired environment, the strengths of the pilot signals transmitted from the different cells continuously change in accordance with the propagation environment including the surrounding buildings and the movement of a terminal user. That is, as the strengths of the pilot signals transmitted from the different cells change, the most favorable pilot signal strength continuously changes in the same manner.

Accordingly, continuously changing the condition of the system with respect to the change of the pilot signal due to fading just will increase the load of the system with no gain generated.

According to the present invention, the threshold is determined so that the system can find the pilot signal having the best signal strength by a signal-to-noise ratio. As a result of a field test, it is preferable that the value of SWITCH THR is set to about 1.5 dB.

If it is judged at the step S32 that there is no good pilot signal having the strength bigger than the threshold value (SWITCH_THR), the present primary cell is maintained as it is (step S33).

On the contrary, if it is judged at the step 32 that there are good pilot signals having the strength bigger than the threshold value (SWITCH_THR), the source BS transmits the burst request message to all the cells having the pilot signals over the threshold value, and thus the corresponding cells perform the radio resource reservation.

FIG. 3 is a flowchart illustrating the procedure of selecting a cell to which traffic data is to be transmitted according to the present invention.

Referring to FIG. 3, if the source BS receives information on the result of the radio resource reservation from the cells that have requested radio resource reservation (step S40), the source BS analyzes the result information, and selects the cell that supports the maximum data rate among the cells that have transmitted the result information in order to select the primary cell (i.e., in the present invention, it means a cell that is now transmitting or will transmit the traffic data through the present SCH) that will actually transmit the traffic data according to the result information (step S41).

At the step S41, the source BS judges whether the number of cells that secure the maximum data rate is two or more (step S42).

If it is judged that the number is two or more, the source BS requests the previously reserved radio resource allocation by transmitting the burst commit message to the cell having the biggest pilot signal strength among the cells that have transmitted the result information (step S44).

If it is judged that the number is not two or more, the target BS reserves the radio resource of the cell that satisfies the step S40, that is, according to the burst request message, and the source BS requests the radio resource allocation to the cell that has transmitted the reservation result (step S43).

In order to support the high-speed data rate, the radio resource that is suitable for the high-speed data rate should be allocated, and the radio resources more than those supporting the low-speed rate should be occupied.

Also, since the number of radio resources and the capacity of radio area are limited, the radio resource reservation for the corresponding cells that have received the burst request message is performed within a limited range.

If a specified cell already uses the radio resource in order to provide a service to a plurality of subscribers, the radio resource should be allocated within the limited range, and thus the radio resource reservation may be performed with a data rate smaller than that requested through the burst request message.

Accordingly, the cells that will transmit the traffic data are selected according to the result information provided from the cells that have requested the radio resource reservation through the processes of FIGS. 2 and 3.

Since the cells already requested to reserve the radio resources is the cells that can sufficiently satisfy the quality of service, the primary cell is selected by the data rate provided as the result information, rather than by the pilot signal strengths of the cells, in order to select the cells that can secure the throughput of the traffic at maximum.

This is because, as illustrated in FIG. 2, the pilot signal strength of the cell that is requested to reserve the radio resource through the burst request message corresponds to the level that can secure the optimum quality.

According to the present invention, the interface between the cells or the base stations is given more weight than the combined gain with respect to the supplemental channel to always maintain only one primary cell. That is, with respect to the supplemental channel is used a method that does not support the soft handoff.

As described above, the present invention secures the optimum service by selecting a cell that is under the best radio environment in case that the radio resource reservation is requested.

Also, the present invention determines a threshold value, and thus prevents a temporary interruption of service caused by the frequent change of the cells that transmit the traffic data due to the instability of the radio environment.

This temporary interruption of service is generated since the transmission of the traffic data is impossible during the time period while the terminal sends the primary cell change request message, for example, the extended supplemental channel assignment message, and then receives a corresponding response.

Also, according to the present invention, in response to the radio resource reservation, the data rate that the user requires is secured at maximum by requesting the traffic data transmission to the cell that satisfies the requested data rate at maximum.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method of allocating a radio resource comprising:
   selecting at least one cell having a pilot signal strength that is greater than a threshold value of a pilot signal strength of a primary cell;
   requesting a communication resource reservation for transmitting packet data on a supplemental channel to each of the at least one selected cell;

receiving results of reservation performed according to the reservation request from each of the at least one selected cell; and requesting allocation of the communication resource to each of the at least one selected cell that secure a maximum data rate for transmitting the packet data by analyzing the results of reservation.

2. The method as claimed in claim 1, further comprising:
judging if a number of each of the at least one selected cell that secure the maximum data rate is plural; and if it is judged that the number is plural, requesting allocation of a communication resource to a cell having a greatest pilot signal strength among each of the at least one selected cell.

3. The method as claimed in claim 1, wherein when requesting the communication resource reservation, the communication resource reservation is requested along with a desired data rate.

4. The method as claimed in claim 1, wherein receiving the results of reservation comprises:
reserving the radio resource corresponding to a supportable data rate according to the request for the communication resource reservation; and reporting a result of reservation.

5. The method as claimed in claim 1, wherein the threshold value of the pilot signal strength of the primary cell is a value that is changed according to a communication environment.

6. The method as claimed in claim 1, further comprising setting a traffic connection with each of the at least one selected cell whose traffic connection is not determined among each of the at least one selected cell selected at requesting the resource reservation.

7. A method of allocating a radio resource in a communication system including a plurality of mobile stations and at least one base station that performs a radio connection of the mobile stations, the method comprising:

having packet data to be newly transmitted on a supplemental channel, selecting at least one target base station having a pilot signal strength that is greater than a threshold value of a reference pilot signal strength at a source base station;

requesting a communication resource reservation for transmitting the packet data on the supplemental channel to each of the at least one selected target base station through a burst request message at the source base station;

reserving a communication resource according to the reservation request, and reporting results of reservation to the source base station as a response message to the burst request message at each of the at least one target base station; and analyzing the results of reservation, and requesting allocation of the communication resource for transmitting the packet data to a target base station that secures a maximum data rate through a burst commit message at the source base station.

8. The method as claimed in claim 7, wherein requesting the allocation of the resource comprises:
selecting a target base station having a greatest pilot signal among the plurality of target base stations that secure the maximum data rate at the source base station; and requesting the allocation of the communication resource to the selected target base station at the source base station.

9. The method as claimed in claim 7, wherein when requesting the communication resource reservation, the communication resource reservation is requested along with a desired data rate.

10. The method as claimed in claim 7, further comprising:
allocating the communication resource according to the allocation request at the target base station; and reporting a result of the communication resource allocation to the source base station.

11. The method as claimed in claim 10, wherein reporting the result comprises:
reserving the radio resource corresponding to a supportable data rate according to the request for the communication resource reservation at the target base station; and reporting a result of the radio resource reservation to the source base station.

12. The method as claimed in claim 7, wherein the threshold value of the pilot signal strength is a value that is changed according to a communication environment.

13. The method as claimed in claim 7, further comprising setting a traffic connection with each of the at least one selected cell whose traffic connection is not determined among each of the at least one selected cell selected at requesting the resource reservation.

14. A radio resource allocation method comprising:
receiving, at a source base station, a request message requesting packet data on a supplemental channel;

receiving burst response messages from all target base stations that are available to provide the requested packet data;

analyzing each burst response message and selecting target base stations corresponding the analyzed burst request messages that provide a maximum data rate for the requested packet data;

determining if two or more target base stations provide the maximum data rate;

if there are two or more base stations that provide the maximum data rate, requesting a radio resource to a target base station of the two or more target base stations that has a strongest pilot strength; and if there are not two more base stations that provide the maximum data rate, requesting a radio resource to the one target base station that transmitted the burst response message.

15. The method as claimed in claim 14, further comprising:
establishing a logical connection between the source base station and the target base station.

16. The method as claimed in claim 15, wherein establishing the connection comprises:
transmitting a handoff request from the source base station to the target base station to set a traffic connection for supporting a supplemental channel to transmit the packet data;

allocating by the target base station a traffic circuit;

transmitting from the target base station a connection message to a single link procedure of the source base station;

transmitting a connection acknowledgement message from the source base station to the target base station in response to the connection message; and transmitting a connection acknowledgement message from the target base station to a call control processor the source base station to report the completion of the connection setting between the source and target base stations.

* * * * *